March 17, 1936. E. E. WICKERSHAM 2,034,125
TRACTOR
Filed Oct. 28, 1930 6 Sheets-Sheet 1

FIG. 1

INVENTOR.
Elmer E. Wickersham
BY

ATTORNEYS.

March 17, 1936.  E. E. WICKERSHAM  2,034,125
TRACTOR
Filed Oct. 23, 1930  6 Sheets-Sheet 2

INVENTOR,
Elmer E. Wickersham
BY

ATTORNEYS.

March 17, 1936.  E. E. WICKERSHAM  2,034,125

TRACTOR

Filed Oct. 23, 1930  6 Sheets-Sheet 5

FIG. 5.

INVENTOR.
Elmer E. Wickersham
BY
ATTORNEYS.

Patented Mar. 17, 1936

2,034,125

UNITED STATES PATENT OFFICE 2,034,125

TRACTOR

Elmer E. Wickersham, San Leandro, Calif., assignor to Caterpillar Tractor Co., San Leandro, Calif., a corporation of California Application October 28, 1930, Serial No. 491,715

27 Claims. (Cl. 180—9.2)

My invention relates to traction machinery and is particularly concerned with self propelled vehicles capable of operating over unprepared roadways. The device of my invention, although not limited thereto, is especially pertinent to tractors of the track laying type.

An object of my invention is to provide a tractor in which the major components are easily constructed as units and assembled together to provide a complete mechanism.

Another object of my invention is to provide a tractor in which a large number of parts ordinarily considered necessary are dispensed with.

A further object of my invention is to provide a tractor which is extraordinarily accessible for assembly, repair and inspection.

The foregoing and other objects are attained in the embodiment of the invention shown in the drawings, in which.

In its preferred form, the tractor of my invention comprises a body, generally tubular, providing a mounting for a source of power and being in telescopic relationship with a transmission unit housing in which a transmission unit is disposed. The tractor also comprises connections between the transmission unit and the source of power and connections between the transmission unit and ground engaging members mounted on the body.

In the form of my tractor which I have chosen to describe herein, there is provided a body 6 which preferably is a tubular housing of cast metal. At a convenient point of its length, the body 6 is formed with a pair of oppositely disposed integral projections, such as outriggers 7 and 8, in which a stationary shaft 9 is disposed. On opposite extremities of the shaft 9, crank arms 11 and 12 are journalled. Since the crank arms are similar, a description of one of them will suffice. The crank arm 12, for instance, is extended forwardly of the body 6 in the form of an I-beam and carries at its forward end a sliding journal block 13 through which an axle 14 passes. On opposite extremities of the axle, a pair of idlers 16 and 17 is mounted. In order to constrain the journal block 13 and, correspondingly, the idlers 16 and 17, I provide a coil spring 18 which at one end abuts the journal block 13 and at the other end abuts a stationary stop 19 secured to the crank arm 12. By virtue of this spring mounting, the idlers 16 and 17 ordinarily are biased toward the forward end of the body 6 but can yield under a superior force.

To constrain the crank arms 11 and 12 resiliently with respect to the body 6, there is provided a transverse leaf spring 21 spanning the crank arms 11 and 12 and mounted for frictional sliding movement in guides 22 and 23 secured to the respective crank arms. Between its ends, the spring 21 is secured to the central portion of the tubular body 6. By virtue of this construction, the crank arms 11 and 12 are each mounted for movement with respect to the body 6; that is, for rotation about the axis of shaft 9. They are, however, resiliently constrained and move only under the urgency of a superior force.

In alignment with the idlers 16 and 17, but disposed adjacent the rearward portion of the body 6, are pairs of driving sprockets 26 and 27. Since the pairs of sprockets on opposite sides of the machine together with their appurtenant mechanism are substantially identical, I shall describe but one pair of them. The sprocket 27 is preferably provided with an extended central hub 28 mounted on anti-friction bearings 29 and 31 for free rotation on an axle casing 32 which is tubular in form and is removably joined at its inner end by fasteners such as studs to a boss 33 forming part of the tubular body 6. Mounted on the hub 28 is the sprocket 26 which is constrained to rotate therewith by a plurality of through bolts 34 which also secure for unitary rotation a driving plate 36 carrying a hub cap 37.

Since my tractor is preferably of the track laying type, although not necessarily so, I prefer to connect the sprockets 26 and 27 and the idlers 16 and 17 on each side of the body 6 with an endless chain or track 38 for engagement with the ground. Although it is customary in tractors of the track layer type to provide tracks which require external support, in this instance I prefer to use a self-supporting track which is flexible in one direction only and requires no external support. Such a self-supporting track is disclosed in the copending application of Clarence Leo Best, Serial Number 231,827, filed November 8, 1927 and entitled Track link.

In a track of the type referred to, there are provided a plurality of similar, interconnected links 39 each of which is pivoted to the succeeding link by a pivot pin 41 and may be provided with a ground engaging projection 42. Each link preferably includes a centrally disposed upstanding lug 43 adapted to interengage with an upstanding loop 44 of the succeeding link In abutting relationship of the lugs 43 and the loops 44, the successive links are immovable for flexure in one direction but are freely rotatable about the pivot pin 41 in the opposite direction. In accordance with this construction, a suitable ground engaging truck is provided at each side of the body 6 without the necessity for employing a complex, heavy truck frame as is ordinarily the case.

To render the tractor of my invention self-propelling I provide it with a source of power. To this end the forward portion of the tubular body 6 is preferably formed with a laterally opening aperture 51 through which a scource of power, such as an internal combustion engine 52, can extend. Preferably, the tubular body 6 is formed with an inturned flange 53 rimming the aperture 51 and machined to provide a planar face against which the upper half 54 of the crank case of the internal combustion engine can abut. The crank case half 54 provides a closure for the aperture 51 so that an oil-tight compartment 56 is formed by the upper half 54 of the crank case and the forward portion of the tubular body 6. The compartment 56 is preferably utilized as the crank chamber of the engine and in order to isolate the crank chamber and to reinforce the body 6 I provide a forward bulkhead 57 comprising a wall integrally formed with the body 6 and disposed at the rear of the compartment 56.

The cylinder block 58 of the engine, including a plurality of cylinder barrels 59, is formed integrally with the upper crank case half 54 and carries an integrally formed or detachable cylinder head 61 in the customary fashion. Also integral with the upper crank case half 54 are bridge walls 62, 63 and 64 which respectively carry the rear main bearing 66, the center main bearing 67 and the front main bearing 68 for the crank shaft 69 of the engine 52. Connecting the crank shaft 69 with pistons 71 operating in the cylinder barrels 59 are connecting rods 72.

At its forward end, the crank shaft 69 carries a nut 73 designed for co-operative engagement with a crank spindle 74 extending through the forward end of the tubular body 6 for attachment of a hand crank thereto. The portion of the crank case half 54 which overlies the spindle 74 forms a bracket 76 for the support of a cooling radiator 77.

Also attached to the forward end of the crank shaft 69 is a gear 78 which meshes with a timing gear 79 on a cam shaft 81 of the customary kind. In engagement with the timing gear 79 is a gear 82 journalled in a detachable housing 83 secured to the upper half 54 of the crank case. Mounted on the shaft 84 is a pulley 85 carrying a belt 86 in engagement with a fan pulley 87. A fan shaft 88 journalled in a bracket 89 which is an extension of the housing 83 carries the pulley 87 and a cooling fan 91 in proper location with respect to the cooling radiator 77

Although not illustrated in detail, the engine is provided with an oiling system of a suitable sort and preferably employs the compartment 56 as an oil sump. I therefore prefer to form the body 6 with a horizontally disposed baffle 92 for providing an auxiliary sump 93. The rearward portion of the auxiliary sump 93 is contoured to allow for a seat 94 for the transverse spring 21, previously described.

The rearward end of the crank shaft 69 carries a suitable flywheel 96 operating in the compartment 56. Preferably formed as a unit with the flywheel is a master clutch 97 of any of the usual constructions provided with a clutch collar 98 for engaging and disengaging the clutch. For actuating the clutch 97, a fork 99 is in engagement with the clutch collar 98 and is pivoted as at 101 to the upper half 54 of the crank case. The fork 99 projects through an aperture and is provided with an eye 102 for connection to a rod 103 extending to a hand lever 104 pivoted as at 106 to the tubular body 6 so that the clutch 97 can be engaged and disengaged by suitable operation of the lever 104. In order to prevent the entry of dirt into the compartment 56 a flexible boot 107 preferably surrounds the fork 99.

Extending from the driven member of clutch 97 is a splined shaft 108 which terminates within a splined bearing, not shown, mounted in a sleeve 109 seated in a boss 111 forming part of the bulkhead 57. The sleeve 109 is freely slidable in the boss 111 and is removably held in place by a set screw 112 accessible through an aperture 113 in the body 6 ordinarily closed by a removable cover plate 114.

By virtue of the engine mounting on the tubular body 6, which has just been described, it is possible to remove the entire engine and clutch unit from the tractor without seriously disturbing any of the other major units. In order to remove the engine 52 together with the fan 91, radiator 77 and their appurtenances and the clutch 97 and its appurtenances it is merely necessary to disconnect the rod 103 at the eye 102, remove the series of studs 116 which retain the upper half 54 of the crank case on the tubular body 6, remove the inspection plate 114 and loosen the set screw 112. The collar sleeve 109 can then be translated axially for a sufficient distance to free the splined shaft 108. At the conclusion of these operations, the entire engine together with its crank shaft, fly wheel, clutch, fan and radiator can be lifted directly out of the tubular body 6 leaving the laterally opening aperture 51 therein exposed. With this type of construction, the removal of the engine for repair purposes or the quick insertion of a spare engine is a simple and expedient matter.

In order to transmit power from the engine 52 to the ground engaging members 38, I preferably employ a transmission unit generally designated 117 which is mounted in a transmission unit housing 118. This housing is preferably of tubular form and is usually constructed of cast metal. Its outer diameter is such that it telescopes within the open end of the tubular body 6 and is secured thereto by means of a flange 119 on the housing 118 and a flange 121 on the body 6 held in place by a series of studs 122. The transmission unit housing 118 at its forward end is preferably closed by a rearward bulkhead 123 forming a compartment 124 rendered oil tight by a closure plate 126 secured by studs 127 to the rearward or otherwise open end of the housing 118.

Within the transmission unit housing 118, I preferably locate a change speed transmission, generally designated as 128, of the sliding gear type. Mounted in a journal 129 provided by a boss in the bulkhead 123 and in a journal 131 provided by a boss forming part of a bridge wall 132 of the transmission unit housing 118 is a main shaft 133. This shaft extends forwardly and is splined as at 134 to engage with the bearing running in the sleeve 109. The splines 134 are preferably of such length that they permit the sleeve 109 to be retracted axially as previously described when it is desired to remove the engine unit.

The shaft 133 within the transmission unit housing 118 is provided with a plurality of gears included in the change speed transmission. A slidable gear 136 is mounted on the shaft 133 for disposal in either one of two positions to afford second and reverse speeds for the tractor. Also mounted on the shaft 133 is a pair of gears 137 and 138 adapted to occupy either of two positions to afford low and high speeds for the tractor. The slidable gears 136, 137 and 138 are selectively translated by means of a shift lever 139 extending above the body 6 for convenient operation by the vehicle driver. The gear shift lever 139 is provided with a ball mounting 141 on a plate 142 secured to the tubular body 6 and extends through aligned apertures 143 and 144 in the tubular body 6 and in the transmission unit housing 118, respectively.

Also included in the change speed transmission are gears to mesh with the sliding gears previously described. Mounted on a shaft 146 which is journalled in a boss 147 in the bulkhead 123 and in a boss 148 in the bridge wall 132 are gears 149, 151 and 152. The gears are fixed on the shaft 146 and are positioned to be engaged selectively by the sliding gears 138, 137 and 136, respectively. The reverse gear is not illustrated herein but is conventional.

At the rearward extremity of shaft 146, a bevel pinion 153 is provided to mesh with a bevel gear 154 carried in anti-friction bearings 156 and 157 mounted in webs 158 forming part of the transmission unit housing 118. The bevel pinion 153 and the bevel gear 154 together constitute a bevel gear drive for transmitting power from the change speed transmission to a cross shaft 159. This shaft extends from the transmission unit housing 118 through the apertured central portion of bosses 161 formed integrally therewith.

In order to steer the tractor of my invention, I preferably incorporate steering clutches. Since these clutches are identical, simply being arranged in reverse order, I shall describe but one of them. At its outer extremity, the shaft 159 is splined as at 162 to carry the driving spider 163 of a steering clutch generally designated 164. The spider 163 is provided with an extension 166 journalled in a bushed boss 167 forming part of a cover plate 168 on a steering clutch housing 169 which is flanged as at 171 to be secured to the boss 161. The driving clutch spider 163 is provided with external splines carrying a plurality of clutch plates 172 which are alternated with driven clutch plates. A driven clutch spider 173 freely rotatable on the extension 166 is normally urged by a plurality of springs 174 toward the driving clutch spider thereby compressing the alternated clutch plates for the transmission of power. The driven clutch plates are externally splined to cooperate with internal splines on a clutch drum 176 which is an enlarged extremity of a sleeve 177 carried in an anti-friction bearing 178 mounted in the clutch housing 169 and is separated from the shaft 159 by a bushing 179.

Due to the bias of springs 174 the clutch spiders are normally positioned to transmit power from the shaft 159 to the sleeve 177 and in order to disengage the clutch when desired, I preferably provide on the driven clutch spider 173 a clutch collar 181 adapted to be axially translated by a fork 182 mounted on a vertical shaft 183 journalled in the steering clutch housing 169. A crank arm 184 on shaft 183 connects to a link 186 extending to a steering clutch lever 187 in convenient reach of the vehicle operator. A corresponding steering clutch lever 188 connects by a link 189 to an operating crank 191 for the corresponding steering clutch on the opposite side of the machine. By suitable operation of the levers 187 and 188, the tractor operator can engage and disengage the two steering clutches selectively.

I preferably augment the operation of the steering clutches for making especially sharp turns by brakes which also are effective to retard the motion of the tractor. Since a pair of similar brakes is used, one associated with each steering clutch, but one of them will be described.

Encompassing the drum 176 and disposed within the housing 169 is a brake band 192 adapted to be released or clamped in retarding position on the drum by means of an actuating rod 193 journalled in the clutch housing 169 and operated by a crank 194 which is connected through a rod 196 to a brake pedal 197. The corresponding brake, not shown, is operated by a pedal 198 connecting through a rod 199 to an operating crank 201. By selectively operating the brake pedals 197 and 198 the tractor operator can retard either or both of the driven drums of the two steering clutches and correspondingly control the tractor.

The driven sleeve 177 of one of the steering clutches terminates in a spur gear 202 while the driven sleeve 203 of the other steering clutch terminates in a spur gear 204. In order to obtain the desired speed reduction and in order to increase the ground clearance of the tractor by obviating the necessity of providing reduction gears having excessive pitch diameters, I prefer to incorporate in the transmission unit a speed reducing unit. To this end, spur gear 202 meshes with a gear 206 which revolves unitarily with a pinion 207 mounted on a stub shaft 208 carried in an anti-friction bearing 209 mounted in the transmission unit housing 118 and in a bushing 211 disposed in a central member 212 forming part of the transmission unit housing 118. Correspondingly, the spur pinion 204 meshes with a gear 213 unitarily formed with a pinion 214 mounted on a stub shaft 216 carried at one end in an anti-friction bearing 217 mounted in the transmission unit housing 118 and at the other end seated in a bushing 218 disposed within the member 212. In accordance with this construction, the gears 207 and 214 are capable of revolving independently or in unison depending upon the operating condition of the two steering clutches.

In mesh with the pinion 207 is a gear 219 clamped in conjunction with an anti-friction bearing 221 on a quill 222. The bearing 221 is piloted in the transmission unit housing 118 while the quill is internally splined to engage with an axle 223 which extends through the axle casing 32 and at its extremity is keyed to engage with the driving plate 36. Correspondingly meshing with pinion 214 is a gear 224 mounted in conjunction with an anti-friction bearing 226 on a quill 227 internally splined to engage an axle 228 extending to drive the sprocket wheels 26 and 27 at the other side of the tractor.

The described construction of the transmission unit and its housing is particularly advantageous in assembling the tractor at the factory and in subsequently disassembling for inspection or repair. In order to remove the entire transmission unit, it is but necessary to release the nuts on the bolts 34 and withdraw the driving plates 36 together with the axles 223 and 228 sufficiently to remove the splines from the quills 222 and 227. The ring of studs 122 can then be removed and after the disconnection of the various links and rods 186, 189, 196 and 199 the entire transmission unit housing together with all of the mechanism mounted on it can be withdrawn from the rear open end of the tubular body 6. This unit is usually of such size that it can be placed upon a bench convenient to the workman so that its initial construction and subsequent repair or inspection are greatly facilitated over present practice. Furthermore, after extraction of the transmission unit housing an entirely new unit can be reinstalled with the lapse of but a very few moments.

Figure 1:
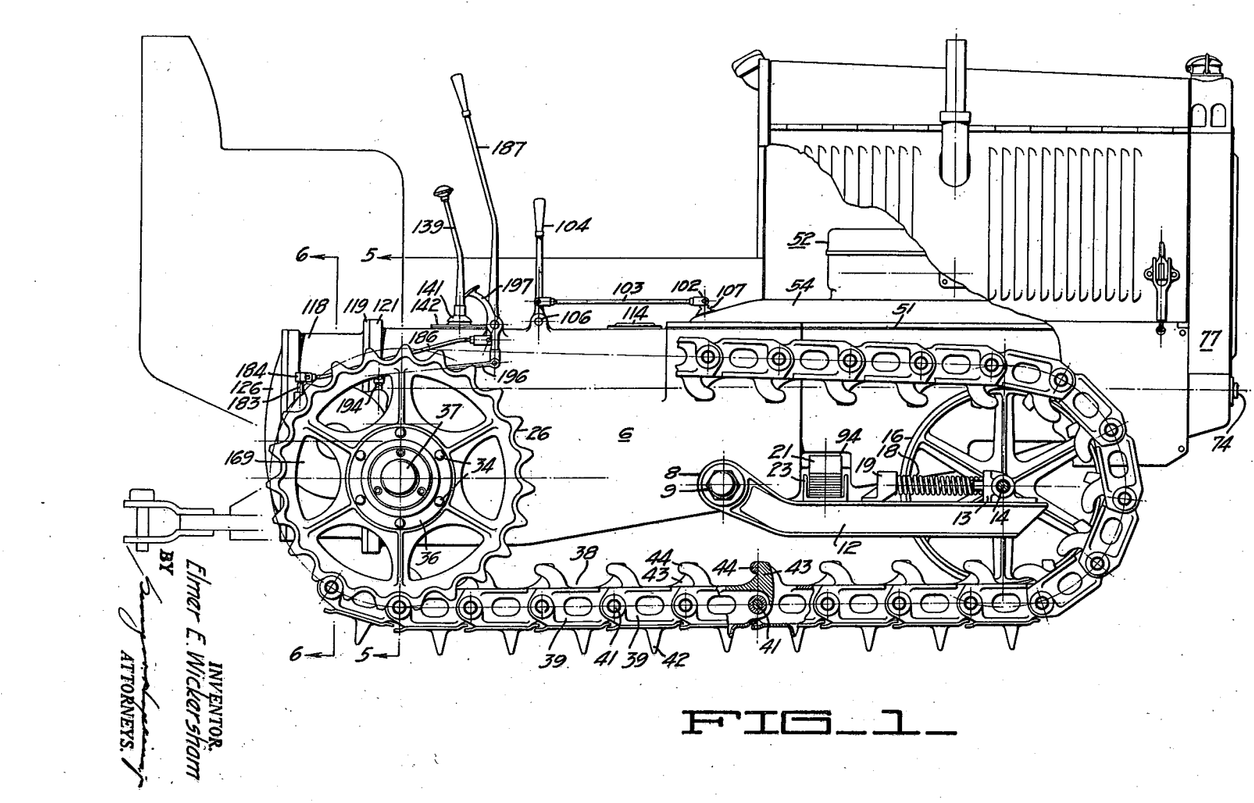
Fig. 1 is a side elevation of a tractor constructed in accordance with my invention, one of the forward idlers being removed.
Figure 2:
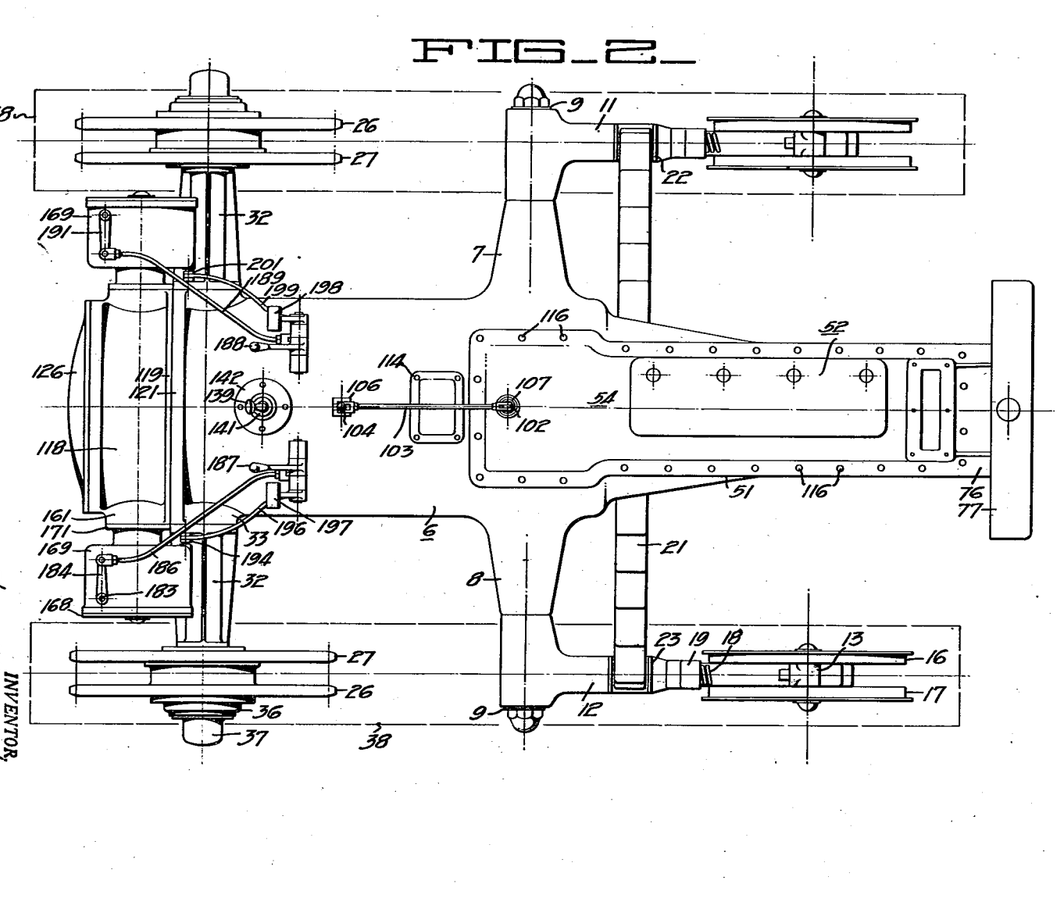
Fig. 2 is a plan of the tractor shown in Fig. 1, certain portions being removed to increase the clarity of the disclosure.
Figure 3:
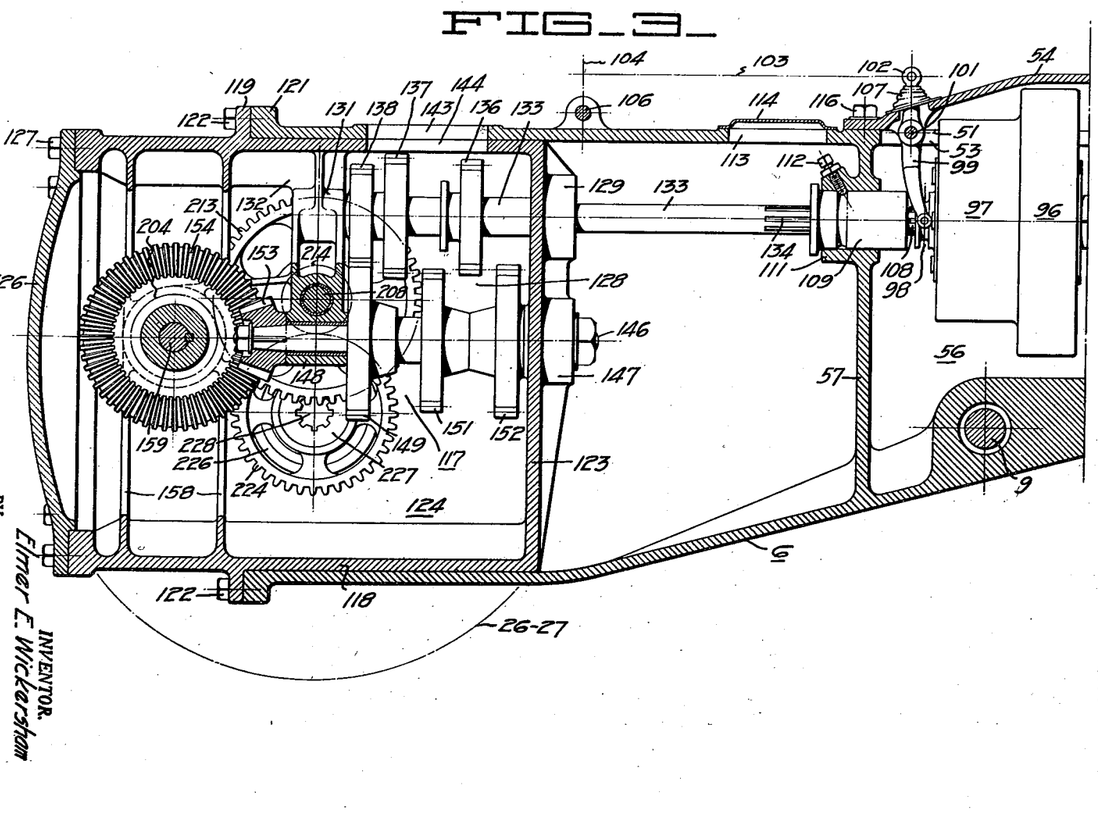
Fig. 3 is a cross section on a vertical longitudinal plane of the rearward portion of the body and transmission unit of my tractor.
Figure 4:
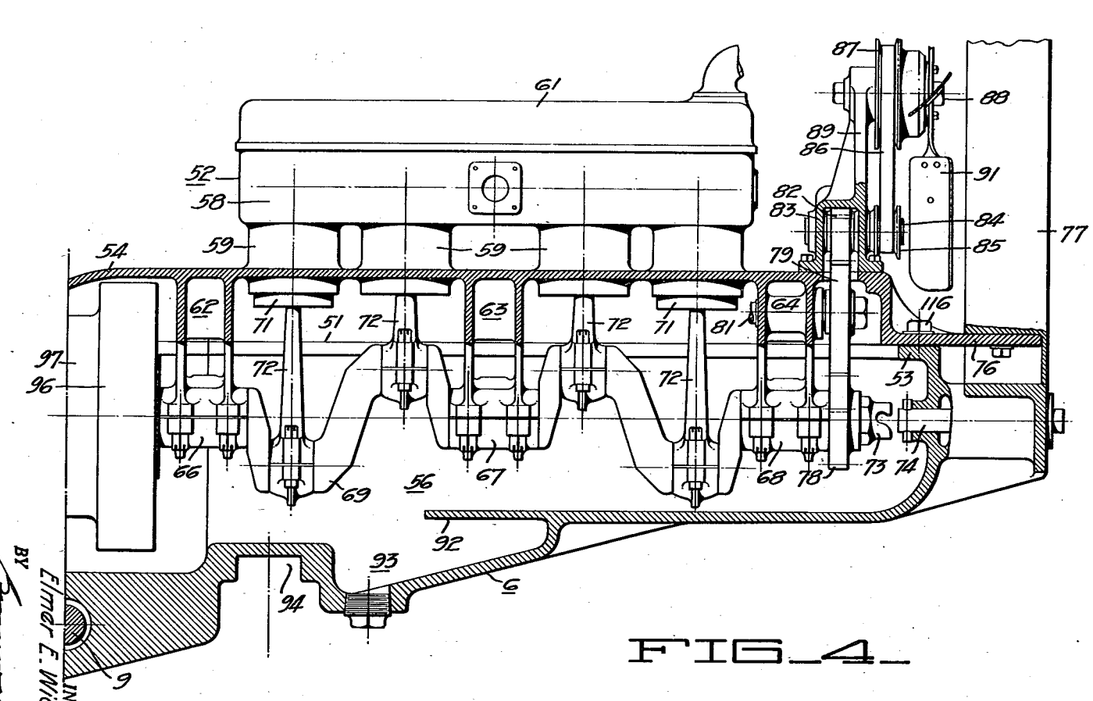
Fig. 4 is a cross section on a vertical longitudinal plane of the forward portion of the tractor body and engine.
Figure 5:
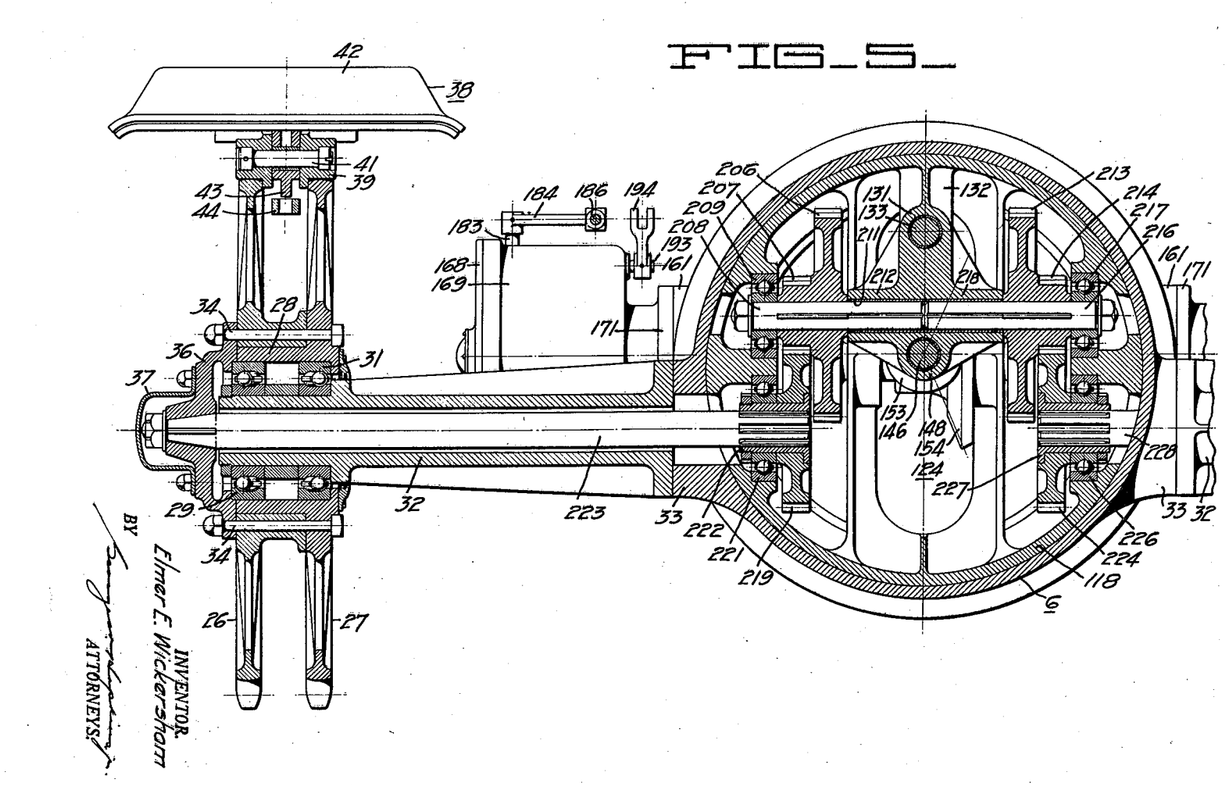
Fig. 5 is a cross section on the line 5—5 of Fig. 1.
Figure 6:
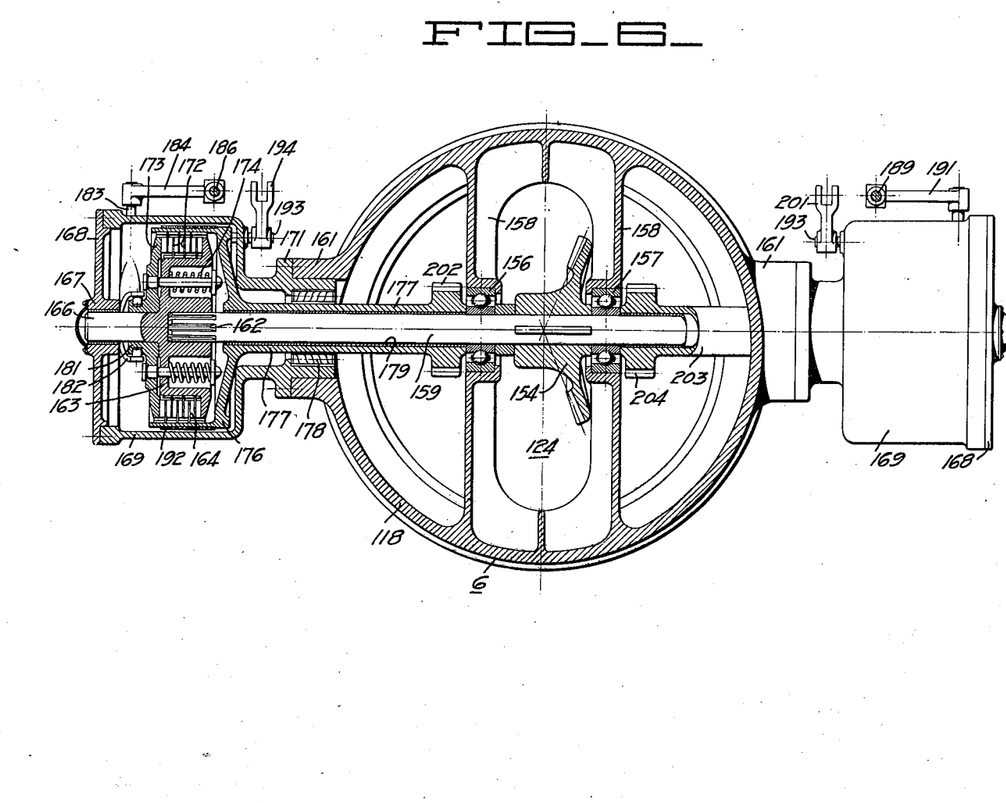
Fig. 6 is a cross section on the line 6—6 of Fig. 1.

However, if it is not desired to remove the entire transmission unit casing the cover plate 126 can easily be removed for inspection or adjustment of the exposed mechanisms. Alternatively the steering clutches together with their housings and appurtenant mechanisms can be detached either individually or together simply by removing the fastening means which secure the steering clutch housings 169 to the bosses 161 whereupon the splines 162 of the shaft 159 disengage from the driving clutch spider and the gears 202 and 204 are axially disengageable from their meshing gears 206 and 213. In this connection (Figs. 5 and 6), it will be noted that shafts 159 and 177, by virtue of the fact that they extend in the same direction from the steering clutch or drive interrupting device, position said device for ready accessibility for replacement or repair. Thus, the drive to and from the drive interrupting device is at the same side of the device, with one end of shaft 177 connected to the final drive means comprising gears 206, 207, etc., and with shaft 159 connected adjacent said end to the driving mechanism of the tractor. The steering clutches themselves thus form a bench assembly which facilitates greatly the production of the tractor and also inspection, repair or the replacement of the individual units in the field within a very short space of time.

Throughout the design and construction of my tractor, I have endeavored to make the various major units compact and easily removable from the tubular body 6 which forms the major support and framework of the machine. It is a matter of but a few moments to assemble the component units of the tractor onto the tubular body 6 to provide a complete machine and furthermore it is a simple matter to remove from the tubular body 6 the individual components either singly or together in order to disassemble the tractor or to replace the individual units with others.

It is to be understood that I do not limit myself to the form of the tractor shown and described herein, as the invention, as set forth in the following claims may be embodied in a plurality of forms.

I claim:

1. A tractor comprising a tubular body, an engine mounted on said body and having its crankshaft within said body, a transmission unit housing telescopically mounted within one end of said body, a transmission unit in said housing connected to said crankshaft, a pair of axle casings projecting from said body, ground engaging members on said casings, and axles within said casings connected to said transmission unit and to said ground engaging members.

2. A tractor comprising a tubular body, an engine mounted on said body adjacent one end thereof, the crankshaft of said engine lying within said body, a transmission unit housing telescopically mounted within the other end of said body, a transmission unit in said housing, a shaft within said body connecting said transmission unit and said crankshaft, ground engaging members mounted on opposite sides of said body, and power transmitting means connecting said transmission unit and said ground engaging members.

3. A tractor comprising a tubular body having a laterally opening aperture adjacent one end thereof and being open at the other end thereof, an engine mounted on said body and projecting through said aperture, a transmission unit housing telescopically mounted within the open end of said body, a transmission unit in said housing, and a shaft within said body connecting said transmission unit and said engine.

4. A tractor comprising a tubular body open at one end and having a laterally opening aperture adjacent the other end thereof; an engine mounted on said body and projecting through said aperture, the crankshaft of said engine lying within said body; a tubular transmission unit housing, open at one end, telescopically mounted within the open end of said body to form a closure therefor; a transmission unit in said housing; and a shaft within said body connecting said crankshaft and said transmission unit.

5. A tractor comprising a body open at one end; a source of power mounted adjacent the other end of said body; a transmission unit housing, open at one end, telescopically mounted within the open end of said body and forming a closure therefor; a transmission unit mounted in said housing; and means for transmitting power from said source of power to said transmission unit.

6. A tractor comprising a body having a cylindrical opening at one end; a source of power mounted on said body adjacent the other end thereof; a cylindrical transmission unit housing adapted to telescope said body opening to form a closure for said opening at said one end of said body; a transmission unit entirely supported on and disposed within said housing; and means for transmitting power from said source of power to said transmission unit.

7. A tractor comprising a body open at one end; a source of power mounted on said body adjacent the other end thereof; a transmission unit housing, open at one end, mounted on and telescoping said body to form a closure for said body; a cover plate closing the open end of said transmission unit housing; a transmission unit in said housing and connected to said source of power; ground engaging members mounted on said body; and means connecting said transmission unit and said ground engaging members.

8. A tractor comprising a body, a source of power on said body, ground engaging members on said body, and a transmission unit telescoping one end of said body to engage said body for support and connected to said source of power and said ground engaging members.

9. A tractor comprising a body, a source of power on said body, ground engaging members on said body, a transmission unit housing removably mounted on said body, and a transmission unit mounted on said housing, said transmission unit including a change-speed transmission connected to said source of power, a bevel gear drive connected to said transmission, and steering clutches connected to said bevel gear drive and to said ground engaging members.

10. A tractor comprising a body, a source of power on said body, ground engaging members on said body, a transmission unit housing on said body, a change-speed transmission on said housing and connected to said source of power, a bevel gear drive on said housing and connected to said transmission, clutch housings mounted on said transmission unit housing, steering clutches in said clutch housing and connected to said bevel gear drive, and means connecting said steering clutches and said ground engaging members.

11. A tractor comprising a body, a source of power on said body, ground engaging members on said body, a transmission unit housing telescopically mounted on said body, clutch housings removably mounted on said transmission unit housing, means mounted in said transmission unit housing for transmitting power from said source of power to said ground engaging members, and steering clutches interposed in said power transmitting means and mounted in said clutch housings.

12. A tractor comprising a body, outriggers on said body, axle casings on said body, ground engaging trucks mounted on said axle casings and said outriggers, axles in said axle casings connected to said trucks and extending into said body, a transmission unit housing on said body, a transmission unit in said transmission unit housing and connected to said axles, clutch housings on said transmission unit housing, clutches included in said transmission unit and disposed in said clutch housings, a source of power on said body, and means for connecting said source of power to said transmission unit.

13. A tractor comprising a body, a pair of axle casings projecting from opposite sides of said body, a pair of outriggers projecting from opposite sides of said body, crank arms on said outriggers, a spring spanning said crank arms and mounted on said body, a pair of ground engaging trucks mounted on said crank arms and axle casings, a source of power on said body, a transmission unit housing on said body, a transmission unit in said transmission unit housing, means connecting said source of power and said transmission unit, a pair of clutches included in said transmission unit, clutch housings encompassing said clutches and mounted on said transmission unit housing, and axles within said axle casings and connected to said transmission unit and to said ground engaging trucks.

14. In a motor vehicle, a casing provided with an opening at one end, and a unitary structure including a transmission, wheels operable by said transmission, steering clutches for said wheels, and a housing for said steering clutches carrying said steering clutches, said housing being slidable onto and off of said casing respectively to position said transmission and said clutches operatively and inoperatively with respect to said casing.

15. A vehicle having a one-piece main frame substantially tubular in transverse cross section and having an opening in an end thereof, a first pair of wheels, members mounted on said frame to mount said pair of wheels rotatably, a transmission unit adapted to be unitarily positioned in said opening to operatively connect said pair of wheels to a source of power, a second pair of wheels, arms hinged on said main frame to support said second pair of wheels, and a self-supporting chain passed about one of each of said pairs of wheels.

16. A vehicle having a one-piece main frame substantially tubular in transverse cross section and having an opening in an end thereof, a first pair of wheels, members mounted on said frame to mount said pair of wheels rotatably, a transmission unit adapted to be telescoped into said opening to operatively connect said pair of wheels to a source of power, a second pair of wheels, arms hinged on said main frame to support said second pair of wheels, and a self-supporting chain passed about one of each of said pairs of wheels.

17. In combination a casing, a wall in said casing, a drive member journalled in said wall, a transmission unit, a housing for said unit adapted to telescope said casing and extend toward said wall, said housing including a bulkhead positioned adjacent said wall when said housing telescopes said casing, and a driven shaft journalled in said bulkhead and engaged with said drive member for rotation.

18. In a tractor, a rigid main frame including a transmission case, ground-engaging members supported by said main frame, a power plant, a transmission, a transmission frame upon which said transmission is supported as a unit, said transmission case of said main frame having an opening through which said transmission frame with the transmission supported thereon is insertable and removable as a unit, said transmission including speed change mechanism and a shaft for connection with said power plant, and steering devices for said ground-engaging members, said steering devices being supported by said transmission frame for positioning therewith and being connected with said transmission.

19. In a track-type tractor, a rigid main frame including a transmission case, a track mechanism at each side of said main frame and supported thereby, a power plant, a transmission, a transmission frame upon which said transmission is supported as a unit, said transmission case of said main frame having an opening in the rear end through which said transmission frame with the transmission supported thereon is insertable and removable as a unit, said transmission frame having a portion projecting beyond the rear end of said transmission case when said transmission frame is in position in said transmission case, said transmission including speed change mechanism and a shaft for connection with said power plant, and steering devices for said track mechanisms, said steering devices being supported by the projecting portion of said transmission frame for positioning with said transmission frame and being connected with said transmission.

20. In a tractor, a main frame including a transmission case, a power plant, ground-engaging members supported by said main frame, a transmission, a transmission frame upon which said transmission is supported as a unit, said transmission case of said main frame having an opening through which said transmission frame with the transmission supported thereon is insertable and removable as a unit, said transmission including speed change mechanism and a shaft for connection with said power plant, a portion of said transmission frame projecting beyond said transmission case when said transmission frame is in position in said transmission case, and steering devices for said ground-engaging members, said steering devices being supported by the projecting portion of said transmission frame and being connected with said transmission.

21. In a track-type tractor, a main frame including a transmission case, a power plant, track mechanisms supported by said main frame, a transmission, a transmission frame upon which said transmission is supported as a unit, said transmission case of said main frame having an opening through which said transmission frame with the transmission supported thereon is insertable and removable as a unit, said transmission including speed change mechanism and a shaft for connection with said power plant, and steering devices for said track mechanisms, said steering devices being supported by said transmission case adjacent the rear end thereof for ready accessibility and being connected with said transmission.

22. In a track-type tractor, a main frame including a transmission case, a power plant, track mechanisms supported by said main frame, a transmission, a transmission frame upon which said transmission is supported as a unit, said transmission case of said main frame having an opening through which said transmission frame with the transmission supported thereon is insertable and removable as a unit, said transmission including speed change mechanism and a shaft for connection with said power plant, and steering devices for said track mechanisms, said steering devices being supported by said transmission case outside thereof for ready accessibility and being connected with said transmission.

23. In a motor vehicle, a main frame including a transmission case, a transmission removably mounted in said transmission case as a unit and without dismantling of said main frame, a drive shaft projecting through said transmission case and detachably connected with said transmission unit a driving wheel means for supporting said driving wheel by said transmission case outside therof for rotation about the axis of said drive shaft, said supporting means being independent of said driving shaft, and detachable means connecting said shaft and said wheel, whereby the transmission unit can be removed by detaching said detachable means and moving said shaft to break the connection between said shaft and said transmission unit.

24. In a motor vehicle, a main frame including a transmission case, a transmission removably mounted in said transmission case as a unit and without dismantling of said main frame, a drive shaft projecting through said transmission case and detachably connected with said transmission unit, tubular supporting means connected to said transmission case outside thereof and through which said drive shaft projects, a driving wheel outside of said transmission case and supported for rotation on said tubular supporting means independent of said drive shaft, and detachable means connecting said shaft and said wheel, whereby the transmission unit can be removed by detaching said detachable means and moving said shaft to break the connection between said shaft and said transmission unit.

25. In a motor vehicle, a main frame including a transmission case, ground-engaging members supported by said main frame, a transmission, a transmission frame upon which said transmission is supported as a unit, said transmission case of said main frame having an opening through which said transmission frame with the transmission thereon is insertable and removable as a unit, and steering devices for said ground-engaging members and supported by said transmission frame outside of said transmission case; each steering device being connected with said transmission by a shaft extending outwardly from said transmission frame, and means including a tubular shaft about said first-mentioned shaft connecting said steering device with a ground-engaging member.

26. A tractor comprising a body, a source of power on said body, spaced ground-engaging means connected to said body, a transmission unit frame removably supported by said body and telescopically insertable and removable through an aperture in said body, a transmission unit supported by said frame for removal therewith and including a change-speed transmission connected to said source of power; and means for driving each of said ground-engaging means from said change-speed transmission including a drive interrupting device, a tubular shaft connected to said device, and a shaft connected to said device and extending through said tubular shaft, said tubular shaft and said shaft providing means for positioning said device for ready accessibility.

27. A tractor comprising a body, a source of power on said body, spaced ground-engaging means connected to said body, a transmission unit frame removably supported by said body and telescopically insertable and removable through an aperture in said body, a transmission unit supported by said frame for removal therewith and including a change-speed transmission connected to said source of power; and means for driving each of said ground-engaging means from said change-speed transmission including a drive interrupting device having driving and driven elements, a shaft connected to one of said elements, and a tubular shaft connected to the other of said elements and journalled for rotation about said shaft.

ELMER E. WICKERSHAM.